US005942152A

United States Patent [19]

Tafesh et al.

[11] Patent Number: 5,942,152

[45] Date of Patent: Aug. 24, 1999

[54] BLEACH SYSTEMS COMPRISING BIS- AND TRIS($\mu$-OXO)DIMANGANESE COMPLEX SALTS

[75] Inventors: Ahmed Tafesh, Corpus Christi, Tex.; Matthias Beller, Ismaning, Germany; Vera Friderichs, Kesten, Germany; Gerd Reinhardt, Kelkheim, Germany

[73] Assignee: Aventis Research & Technologies GmbH & Co. KG, Frankfurt am Main, Germany

[21] Appl. No.: 08/775,354

[22] Filed: Jan. 3, 1997

[30] Foreign Application Priority Data

Jan. 4, 1996 [DE] Germany ........................... 196 00 159

[51] Int. Cl.$^6$ .............................. C09K 3/00; C11D 3/39; C11D 3/395

[52] U.S. Cl. ............................... 252/186.39; 252/186.38; 252/186.33; 252/186.43; 510/311

[58] Field of Search ......................... 252/186.33, 186.38, 252/186.39, 186.43; 510/311

[56] References Cited

U.S. PATENT DOCUMENTS

| | | | |
|---|---|---|---|
| 5,114,611 | 5/1992 | Van Kralingen et al. | 252/186.33 |
| 5,244,594 | 9/1993 | Favre et al. | 252/186.33 |
| 5,256,779 | 10/1993 | Kerschner et al. | 540/465 |
| 5,686,014 | 11/1997 | Baillely et al. | 252/186.33 |
| 5,720,897 | 2/1998 | Drago et al. | 252/186.33 |

FOREIGN PATENT DOCUMENTS

| | | |
|---|---|---|
| 0 458 398 | 11/1991 | European Pat. Off. . |
| 93/25562 | 12/1993 | WIPO . |
| 95/27773 | 10/1995 | WIPO . |
| 95/28467 | 10/1995 | WIPO . |

*Primary Examiner*—Joseph D. Anthony

[57] ABSTRACT

Bleach systems comprising bis- and tris($\mu$-oxo)dimanganese complex salts as catalyst Bis- and tris($\mu$-oxo)dimanganese complex salts of the formula $$[LMn(\mu\text{-}O)_a(\mu\text{-}OAc)_bMnL]^xA_y$$

as catalysts for oxidizing organic compounds, in which formula

Ac is a $C_2$–$C_8$-acyl group, a is 1, 2 or 3, b is 0 if a is 2 or 3 or is 2 if a is 1, x denotes the number of positive charges and is 2 or 3, A is an anion, y is the equivalent amount of anion A required to compensate the positive charges, and L is a ligand, preferably N,N'-bis(2-pyridylmethyl)-N-methylamine or N,N,N',N'-tetrakis(2-pyridylmethyl)-1,2-ethylenediamine are employed as catalysts in bleach systems for textile material.

10 Claims, No Drawings

BLEACH SYSTEMS COMPRISING BIS- AND TRIS($\mu$-OXO)DIMANGANESE COMPLEX SALTS

Bleaches which release active oxygen are a major constituent of modern detergents and cleaners. Their principal function is to remove stubborn stains such as tea, coffee, red wine or fruit juice from textile fibers or solid surfaces. They do this by oxidatively destroying the chromophoric system; at the same time, adhering microorganisms are killed and odor substances are neutralized.

The bleaching agent used is in most cases hydrogen peroxide or an organic or inorganic peracid. In pulverulent products, the source of active oxygen employed is in most cases a persalt. Typical examples of such salts are sodium perborates, sodium percarbonates or urea adducts.

In order to increase the efficiency of these per compounds in the temperature range from 40 to 60° C., bleach activators are often added. Examples of these are tetraacetylethylenediamine (TAED), diacetyidioxohexahydrotriazine (DADHT), pentaacetylglycose (PAG), benzoyloxybenzenesulfonate (BOBS) and nonanoyloxybenzenesulfonate (NOBS). In the presence of the activator, the persalts liberate the corresponding peracids, which usually have a broader spectrum of action than hydrogen peroxide.

In many cases, however, even the combination of a persalt with an activator still does not produce optimum bleaching properties. Particular problems of such bleaching systems are their limited effectiveness when used at low temperatures and their lack of reactivity toward certain stains.

There is therefore a desire for systems of still greater performance. For economic and environmental reasons, additives with a catalytic action are preferred. In addition, however, there is also a requirement for catalysts which react directly with hydrogen peroxide or Caroates and which markedly reduce the concentration of activator or render the latter superfluous.

It has been known for many years that transition metals in free or complexed form catalyze the decomposition of hydrogen peroxides. The activity of the compounds described to date, however, is unsatisfactory in the majority of cases. In many of these cases, although the addition of metal salts does lead to catalytic decomposition of the hydrogen peroxide, no bleaching effect is observed. This is usually associated with damage to the textile fabric. The occurrence of free transition metals during the washing and cleaning process, therefore, is undesirable. If, however, the metal salt is used in complexed form, the complex involved must be stable to hydrolysis and oxidation during storage and under service conditions, so that these side effects are suppressed.

Complexes of copper or of cobalt with pyridinemono- or -dicarboxylic acid are described in U.S. Pat. No. 3,156,654. U.S. Pat. No. 3,532,634 teaches the use of picolinic acids, pyrrolidinecarboxylic acids or phenanthroline. U.S. Pat. No. 4,430,243 claims EDTA and EDTMP complexes of copper, iron and manganese as bleaching catalysts while according to U.S. Pat. No. 4,478,733 manganese salts can be employed successfully in detergent formulations based on zeolite/orthophosphate. Other compounds which have been described as effective complexing agents for transition metals are hydroxycarboxylic acids (EP-A 237 111), porphyrin systems (EP-A 306 089), 2,2'-bispyridylamines (EP-A 392 592), salen derivatives (EP-A 408 131), macrocyclic polyamines (EP-A 439 387) or polyols such as sorbitol (EP-A 443 651). For environmental reasons, manganese is usually the central atom of choice, although complexes of iron, copper and cobalt are also known.

EP-A 458 397 and 458 398 describe the use of macrocyclic polyamines as complex ligands in polycyclic, oxygen-bridged manganese complexes. In combination with oxidizing agents these complexes display good bleaching properties, especially with regard to tea stains. A disadvantage, however, is the difficult-to-obtain complex ligand of the triazacyclononane type. It can be obtained only in a multistage preparation process where byproduct is abundant. EP 544 519 describes similar complexes, where again the synthesis of the complex ligand is extremely laborious and difficult to carry out on an industrial scale.

Consequently there continues to be a need for effective bleaching catalysts which are simple to prepare and have a broad spectrum of action for use in detergents and cleaners.

It has surprisingly now been found that the manganese complex salts described below are outstandingly suited to use in detergents and cleaners and, even in catalytic amounts, multiply the activity of hydrogen peroxide, peracetic acid and other bleaching systems. The ready availability of these catalysts is a particular advantage over the prior art.

The invention provides bleach systems comprising bis- and tris($\mu$-oxo)dimanganese complex salts of the formula I $$[LMn(\mu\text{-}O)_a(\mu\text{-}OAc)_bMnL]^xA_y \qquad (I)$$

in which

Ac is a $C_2$–$C_8$-acyl group, a is 1, 2 or 3, b is 0 if a is 2 or 3 or is 2 if a is 1, x denotes the number of positive charges and is 2 or 3, A is an anion with a negative charge of one or two, y is the equivalent amount of anion A required to compensate the positive charges, and L is a ligand of the formula II or III (II)

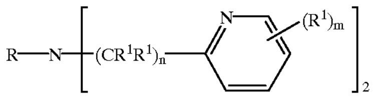

-continued (III)

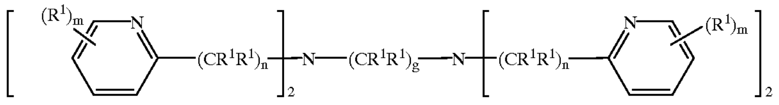

in which R is $C_1$–$C_{12}$-alkyl, $C_5$–$C_{10}$-cycloalkyl, phenyl, $NH_2$, $NHR^2$, $N(R^2)_2$, OH, $OR^2$ or COOH, $R^1$ is hydrogen, $C_1$–$C_{12}$-alkyl, $C_5$–$C_{10}$-cycloalkyl, $NH_2$, $NHR^2$, $N(R^2)_2$, OH, $OR^2$, COOH, $COOR^2$, Cl, Br, F or CN, $R^2$ is $C_1$–$C_{12}$-alkyl or $C_5$–$C_{10}$-cycloalkyl, g is 2 or 3, and m and n are zero or an integer from 1 to 4.

Preferred ligands of the formulae II and III are those in which all substituents $R^1$ in the ligands L are hydrogen and n=1. Where a=3 and b=0, L is preferably a ligand of the formula II. Also preferred are complex salts of the formula I, in which a=1 and b=2 and L is a ligand of the formula II. In compounds of the formula I where L is a ligand of the formula II, R is preferably $C_1$–$C_4$-alkyl, especially methyl. Suitable anions A are $Cl^-$, $Br^-$, $I^-$, $NO_3^-$, $ClO_4^-$, $NCS^-$, $PF_6^-$, $RSO_3^-$, $RSO_4^-$, $SO_4^{2-}$, $BPh_4^-$, $OAc^-$. Preferred anions are $PF_6^-$, $ClO_4^-$ and tosylate.

The ligands of the formula III in these manganese complex salts are prepared by reacting 2-(chloromethyl) pyridinium chloride with an alkylenediamine in the presence of a phase transfer catalyst (see Synthesis, June 1992, pp. 539–540) and analogously for the substituted, other ligands of the formula III. Similarly, the ligands of the formula II are prepared by reacting 2-(chloromethyl)pyridinium chloride or analogous pyridinium compounds with an amine R—$NH_2$. The manganese complex salts of the formula I are prepared as described in Inorg. Chem. 1989, 28, 3606–3608, by using $H_2O_2$ to oxidize an aqueous solution containing $MnCl_2$ and the ligand, or in analogy to the technique described in Inorg. Chem. 1994, 33, 4105–4111, where oxidation is carried out with ammonium peroxodisulfate.

Examples of particularly preferred complex ligands are:

N,N'-bis(2-pyridylmethyl)-N-methylamine

N,N,N',N'-tetrakis(2-pyridylmethyl)-1,2-ethylenediamine

N,N,N',N'-tetrakis(2-pyridylmethyl)-1,3-propylenediamine

N,N,N',N'-tetrakis(2-pyridylethyl)-1,3-propylenediamine

N,N,N',N'-tetrakis(2-pyridylethyl)-1,4-butylenediamine

The metal complexes can either be added in ready-made form to the detergent or cleaner, or be generated in situ from ligand and transition metal in the course of the washing process.

Examples of complex salts to be used in accordance with the invention are:

bis($\mu$-oxo)bis[N,N,N',N'-tetrakis(2-pyridylmethyl)-1,2-ethylenediamine]dimanganese(III,IV) perchlorate tris($\mu$-oxo)bis[N,N,N',N'-tetrakis(2-pyridylmethyl)-1,2-ethylenediamine]dimanganese(IV,IV) hexafluorophosphate ($\mu$-oxo)bis($\mu$-OAc)bis[N,N,N',N'-tetrakis(2-pyridylmethyl)-1,2-ethylenediamine]dimanganese(III, III) perchlorate ($\mu$-oxo)bis($\mu$-OBu)bis[N,N,N',N'-tetrakis(2-pyridylmethyl)-1,2-ethylenediamine]dimanganese(III, III) perchlorate tris($\mu$-oxo)bis[N,N,N',N'-tetrakis(2-pyridylmethyl)-1,3-propylenediamine]dimanganese(IV,IV) hexafluorophosphate bis($\mu$-oxo)bis[N,N'-bis(2-pyridylmethyl)-N-methylamine]dimanganese(III,IV) perchlorate tris($\mu$-oxo)bis[N,N'-bis(2-pyridylmethyl)-N-methylamine]dimanganese(IV,IV) hexafluorophosphate ($\mu$-oxo)bis($\mu$-OBu)bis[N,N'-bis(2-pyridylmethyl)-N-methylamine]dimanganese(IV,IV) hexafluorophosphate These complex salts possess catalytic properties and are able to bring about a considerable increase in the bleaching performance of peracids, persalts or hydrogen peroxide in the washing and cleaning process.

In the novel bleach system the bleaching catalysts are employed in combination with an oxidizing agent. Examples of such oxidizing agents which may be used are hydrogen peroxide, alkali metal perborates, percarbonates, perphosphates and persulfates. If the catalysts are employed in powder products, particular preference is given to sodium perborate monohydrate or tetrahydrate, Caroate in the form of the triple salt, and to sodium percarbonate, the latter in particular in coated form. These compounds may be used either with the catalysts alone or, in accordance with a preferred embodiment, together additionally with a bleach activator. This widens the spectrum of application and reinforces the microbicidal properties of the formulation.

Bleach activators are known from numerous patent applications. Examples thereof are reactive esters and amides as described in GB 836,988, 864,798, 907,356, 1,003,310 and 1,519,351; EP 284 292, 331 229, 303 520, 185 522, 174 132 and 120 591 and U.S. Pat. Nos. 1,246,339, 3,332,882, 4,128,494, 4,412,934, 4,675,393, 4,751,015 and 4,397,757. Particular preference is given to tetraacetylethylenediamine, nonanoyloxybenzenesulfonate, benzoyloxybenzenesulfonate, nonanoyl- and benzoylcaprolactam, isatoic, maleic, succinic and citric anhydrides, and acylated sugars or sugar derivatives, and also alkyl- or aryinitriles.

In place of the activator system (persalt plus bleach activator) it is also possible to employ certain organic peroxycarboxylic acids directly as oxidizing agents. Typical representatives are peroxybenzoic acid and substituted derivatives, and aliphatic mono- and dicarboxylic acids such as pemonanoic acid, perlauric acid, 1,9-diperoxyazelaic acid and 1,12-dodecanediperacid. Further examples are N,N'-phthaloylaminoperoxycarboxylic acids, such as N,N'-phthaloylaminoperoxyhexanoic acid (PAP), 6-octylamino-6-oxoperoxyhexanoic acid, monoperoxyphthalic acid and salts thereof, 2-alkylperoxy-1,4-butanedioic acids, or 4,4'-sulfonylbisperoxybenzoic acid.

The composition of the novel bleach system may vary within wide limits and in general comprises from 0.0005 to 2% by weight, preferably from 0.001 to 0.5% by weight, of the described bleaching catalyst and from 1 to 99.9995%, preferably from 5 to 99.999%, of an oxidizing agent from the group consisting of inorganic and organic peracids and persalts, if desired with from 0 to 70%, preferably from 10 to 60%, of a bleach activator.

The novel bleaching systems are used in heavy duty detergents, multicomponent detergents (modular systems), scouring salts, stain pretreatment products, dishwasher rinse aids, cleaners for hard surfaces, disinfectants and denture cleansers. In addition to bleaching, the catalysts also take over the function of dye transfer inhibitors. The catalysts are normally added in granulated form to the detergent or cleaner. In this case granulation auxiliaries which can be used are inorganic salts, such as sodium sulfate, chloride, or phosphate, or silicates. In a preferred embodiment, they are incorporated into the activator granules. Prior art inorganic or organic auxiliaries can be used for granulation, preference being given to film-forming materials such as surfactants, fatty acids, cellulose derivatives or polymers. The granules can additionally be provided with a coating in order firstly to increase their shelf life and to prevent interactions with other detergent ingredients during storage and secondly to influence their dissolution kinetics.

The novel bleach systems, consisting of catalyst, oxidizing agent and, if used, activator, are customarily employed in the detergents and cleaners in the following concentrations:

Heavy duty detergents: from 2 to 40% by weight

Scouring salts and laundry pretreatment products: from 20 to 100% by weight

Dishwasher rinse aids: from 1 to 30% by weight

Cleaners for hard surfaces, and disinfectant cleaners: from 2 to 50% by weight

Denture cleansers: from 2 to 20% by weight

The novel bleach system can be added in the form of a powder or as granules to the detergents and cleaners.

In addition to the bleach system, the detergents and cleaners normally also include surface-active compounds, such as anionic, nonionic, zwitterionic, amphoteric or cationic surfactants, builders, enzymes and additives.

Surfactants can be of natural or synthetic origin and are described, for example, in "Surface Active Agents and Detergents" Volumes I and II by Schwartz, Perry and Berch. Examples are alkyl sulfates, alkylsulfonates, alkylarylsulfonates, alpha-sulfo fatty acid methyl esters, soaps and alkyl ether sulfonates. Nonionic surfactants, such as alkyl polyglycol ethers, alkyl polyglucosides, glucamides, sugar esters and amine oxides, may likewise be used.

Important builders and cobuilders which can be used in combination with the novel bleach systems are phosphates, such as sodium tripolyphosphate, zeolites of type A, X and P, alkali metal carbonates and bicarbonates, amorphous and crystalline silicates, especially phyllosilicates, such as SKS-6, 7, 9 or 10 from Hoechst AG or disilicates, as marketed by Akzo under the trade name Britesil®. Cobuilders which can be used include organic carboxylic acids, such as citric acid or amino acids, and also polymers of the polyacrylic acid type or copolymers of acrylic acid and maleic acid or derivatives thereof. It is also possible to add phosphonate or other complexing agents.

Enzymes which can be used are amylase, proteases, lipases, cellulases and peroxidases, while other additives include cellulose ethers, silicones, bentonites, fluorescent whiteners and fragrance.

Examples of the preparation of the catalysts.

EXAMPLE 1

($\mu$-Oxo)bis($\mu$-acetato)bis[N,N,N',N'-tetrakis(2-pyridylmethyl-)1,2-ethylenediamine]dimanganese (IV,IV) perchlorate (catalyst K1)

A mixture of 25.5 ml of ethanol and 4.5 ml of water was degassed by applying a vacuum three times and treated with argon in order to remove all traces of oxygen, which would otherwise oxidize $Mn^{II}$ to $Mn^{IV}$. 2.47 g (5.82 mmol) of N,N,N',N'-tetrakis(2-pyridylmethyl)ethylenediamine were added to this mixture, to give a yellow solution with a pH of 8.8. Then 0.96 g (3.6 mmol) of manganese triacetate ($Mn(OAc)_3 .2H_2O$) was added. The solution turned brown and now had a pH of 6.2. Subsequently, 2 g (14.58 mmol) of sodium acetate were added (pH 6.5), then perchloric acid (55 drops) to a pH of 5. Following the addition of 3 g (24.48 mmol) of sodium perchlorate, a precipitate was formed at a pH of 6.1. The reaction mixture was stirred for 4 hours. The precipitated crystals were filtered off and dried under nitrogen, to give 3.08 g of crude product of the compound ($\mu$-oxo)bis($\mu$-acetato)bis[N,N,N',N'-tetrakis(2-pyridylmethyl)1,2-ethylenediamine]dimanganese(IV,IV) perchlorate.

| Analysis: | | | | | |
|---|---|---|---|---|---|
| calc.: | Mn 8.39% | C 51.35% | H 4.92% | N 12.83% | O 17.1% |
| found: | Mn 8.4% | C 48.0% | H 4.9% | N 12.7% | O 17.9% |

EXAMPLE 2

($\mu$-Oxo)bis($\mu$-butyrato)bis[N,N,N',N'-tetrakis(2-pyridylmethyl-)1,2-ethylenediamine]dimanganese (III,IV) perchlorate (catalyst K2)

2.47 g (5.82 mmol) of N,N,N',N'-tetrakis-(2-pyridylmethyl)-1,2-ethylenediamine were dissolved in 30 ml of a mixture of ethanol and water (5:1) and then $Mn(acetate)_3.2H_2O$ (0.96 g; 3.6 mmol) was added. Then 2.2 g (20 mmol) of sodium butyrate were added follow by 2 ml of $HClO_4$ (70% strength). A pH of 7.5 was established. Then 3 g (24.48 mmol) of $NaClO_4$ were added and this mixture was stirred at room temperature for 4 hours. A precipitate was formed which was filtered off, washed with an ethanol/water mixture (85% EtOH/15% $H_2O$) and dried to give a crude yield of 2.3 g. The solid was treated with 70 ml of acetone, and the acetone solution was filtered to remove the insoluble inorganic salts. Removal of the acetone by distillation and recrystallization of the residue from ethanol/water 5:1 gave the abovementioned complex salt.

| Analysis: | | | | |
|---|---|---|---|---|
| calc.: | Mn 7.5% | C 49.17% | H 4.95% | N 11.47% |
| found: | Mn 8.0% | C 44.8% | H 4.5% | N 12.1% |

EXAMPLE 3

Tris($\mu$-oxo)bis[N,N,N',N'-tetrakis(2-pyridylmethyl)-1,3-diaminopropane]dimanganese(IV, IV) hexafluorophosphate (catalyst K3)

3.5 g (19 mmol) of $KPF_6$ and 3.86 g (8.8 mmol) of N,N,N',N'-tetrakis(2-pyridylmethyl)-1,3-diaminopropane were added at 5° C. to 120 ml of an ethanol/water mixture (5:1), and the resulting mixture was stirred. The solution turned yellow, and 3.48 g (17.6 mmol) of $MnCl_2.4H_2O$ were added. To this pale yellow solution were then added 20 ml of $H_2O_2$ (3% strength) and 5.2 ml of NaOH (20% strength). The temperature rose to 12° C. and the reaction mixture turned brown. It was then cooled at 5° C. for 1 hour and subsequently maintained at room temperature for 2 hours. The solvents were distilled off in vacuo and the crude product obtained was treated with acetone in order to remove excess manganese dioxide.

| Analysis: | | | |
|---|---|---|---|
| calc.: | C 35.86% | H 3.75% | N 9.29% |
| found: | C 33.8% | H 3.2% | N 8.3% |

EXAMPLE 4

Tris($\mu$-oxo)bis[N,N'-bis(2-pyridylmethyl)-N-methylamine]dimanganese (IV,IV) hexafluorophosphate (catalyst K4)

1.74 g (8.8 mmol) of $MnCl_2.4H_2O$, 1.88 g (8.8 mmol) of N,N'-bis(2-pyridylmethyl)-N-methylamine and 1.75 g (9.5 mmol) of $KPF_6$ were dissolved in 600 ml of a mixture of ethanol and water (2:1). The solution was stirred at room temperature for 20 minutes and then cooled to 5° C. in an icebath. Subsequently, 10 ml of $H_2O_2$ (3% strength) and 2.6 ml of a 20% strength aqueous NaOH solution were added, the temperature rising to 10° C. and a precipitate being formed. This mixture was stirred at 5° C. for 1 hour and at 20° C. for a further hour. The precipitate was filtered off and washed with water to give a crude yield of 6.1 g. The solid was dried and then treated with acetone, leaving $MnO_2$ as a solid. The acetone solution was filtered to remove the insoluble $MnO_2$ and the acetone was removed by distillation to give 1.25 g of a gray-green solid.

| Analysis: | | | |
|---|---|---|---|
| calc.: | C 40.9% | H 3.8% | N 10.9% |
| found: | C 35.0% | H 3.6% | N 9.42% |

EXAMPLE 5

($\mu$-Oxo)bis($\mu$-butyrato)bis[N,N'-bis(2-pyridylmethyl)-N-methylamine]dimanganese(IV,IV) perchlorate (catalyst K5)

A mixture of 25.5 ml of ethanol and 4.5 ml of water was freed from oxygen by applying a vacuum three times and passing in argon. To this mixture there were added 1.25 g (5.82 mmol) of N,N'-bis(2-pyridylmethyl)-N-methylamine in the form of a solution in 25.5 ml of ethanol and 4.5 ml of water. The reaction mixture turned brown. Then 0.96 g (3.6 mmol) of $Mn(acetate)_3.2H_2O$ were added and, after the reaction mixture had turned dark brown, 2.2 g (20 mmol) of sodium butyrate were added. Then 1.8 ml of $HClO_4$ (70% strength) were added, the pH reaching a level of 5.0, followed by 3.0 g (24.48 mmol) of $NaClO_4$. After 4 hours the precipitate obtained was filtered off in order to remove excess manganese dioxide. The solvent was removed from the filtrate by distillation, and recrystallization from 20 ml of isopropanol gave the title compound as a white solid.

Comparison compounds used were manganese(II) sulfate and the tetradentate manganese complex bis($\mu$-oxo)bis[N,N'-bis(2-pyridylmethyl)-N,N'-dimethyl-1,2-ethylenediamine]dimanganese(III,IV) perchlorate (catalyst V1).

USE EXAMPLES

Example 1

Stability of hydrogen peroxide in the presence of the catalysts 0.5 g of sodium perborate monohydrate was dissolved in 1 l of water (15° dH [German hardness]) and conditioned at 20° C. 4 mg of a manganese compound were added, and the concentration of hydrogen peroxide was then monitored over time by means of iodometric titration.

Content of hydrogen peroxide in the solution

| | Time | | | |
|---|---|---|---|---|
| Catalyst | 0 min | 10 min | 20 min | 30 min |
| none | 100% | 100% | 99% | 99% |
| $Mn_2SO_4$ | 100% | 75% | 42% | 23% |
| K1 | 100% | 99% | 100% | 99% |
| K2 | 100% | 100% | 99% | 98% |
| K5 | 100% | 100% | 98% | 98% |

The results show that the novel catalysts, unlike free manganese ions, provide controlled decomposition of hydrogen peroxide.

Example 2

Stability of peracetic acid in the presence of the catalysts 1 g of sodium percarbonate and 0.5 g of TAED powder (TAED: tetraacetylethylenediamine) are placed together with 0.01 g of the manganese compound in 1 l of water (15° dH) which is conditioned at 40° C. The quantity of peracetic acid liberated is determined over time by means of iodometric titration.

Content of peracetic acid in the solution

| | Time | | | |
|---|---|---|---|---|
| Catalyst | 0 min | 10 min | 20 min | 30 min |
| none | 0% | 88% | 77% | 70% |
| $Mn_2SO_4$ | 0% | 66% | 37% | 27% |
| K1 | 0% | 88% | 70% | 59% |
| K4 | 0% | 75% | 64% | 56% |

The results show that neither the release of the peracid nor its stability in aqueous solution is substantially affected by the novel catalysts. Uncontrolled decomposition as a result of traces of metal does not take place.

Example 3

Washing experiments in the Linitest apparatus 2 g/l of test detergent (P-free, WMP, Krefeld Laundry Research Institute [WFK]) were dissolved in 200 ml of water (15° dH). Then 1 g/l of sodium percarbonate and 0.5 g/l of TAED and in each case 4 swatches of a soiled test fabric (tea on cotton, BC-1, WFK) were added. The washing experiments were carried out at 40° C. in a Linitest apparatus from Heraeus, Hanau, for a washing period of 30 minutes. The whiteness of the laundry was then determined using an Elrepho instrument (from Datacolor). In a second series of experiments, 10 mg/l of a catalyst were added. The table of results lists the differences in reflectance found between laundry with and without catalyst.

| Catalyst | ΔRE |
|---|---|
| none | 0 |
| K1 | +5.9 |
| K2 | +6.5 |
| K3 | +5.5 |
| K4 | +5.8 |
| K5 | +5.2 |
| $Mn_2SO_4$ | +4.3 |
| V1 | +5.0 |

The results indicate the superiority of the novel catalysts based on tri- and hexadentate complex ligands relative to free manganese ions and to the non-novel catalyst V1.

Example 4

Washing experiments in the Linitest apparatus

The experiments were carried out as described in Example 3 but using, instead of the test tea stain (BC-1), beetroot and curry on cotton (from WFK).

| Catalyst | Beetroot ΔRE | Curry ΔRE |
|---|---|---|
| none | 0 | 0 |
| K1 | +2.0 | +0.6 |
| K4 | +1.1 | +0.1 |
| K2 | +4.0 | +0.9 |

By using the novel catalysts it is also possible to bring about a marked increase in the bleaching results on the test stains beetroot and curry.

Example 5

Concentration dependency of the catalyzed hydrogen peroxide bleach

The washing experiments were carried out in the Linitest apparatus at 40° C. for a washing period of 30 minutes. 1.5 g/l WMP were predissolved in 200 ml of water (15° dH), and 0.5 g/l of sodium perborate monohydrate was added. Before starting the washing experiments, 0; 1.5; 3; 6; 12; and 25 mg/l of the catalysts were added. The washing experiments were conducted similarly to Example 3. The Table lists the differences in reflectance, ΔRE, between laundry with and without catalyst.

| | Catalyst concentration [mg/l] | | | | | |
|---|---|---|---|---|---|---|
| Catalyst | 0 | 1.5 | 3 | 6 | 12 | 25 |
| K1 | 0 | +2.0 | +2.0 | +3.2 | +2.6 | +2.7 |
| K4 | 0 | +2.7 | +3.0 | +3.7 | +5.8 | +4.6 |
| K2 | 0 | +1.6 | +2.3 | +3.2 | +4.8 | +5.1 |

The results show that the novel catalysts even at very low concentrations bring about a marked increase in the bleaching performance of hydrogen peroxide.

Example 6

Concentration dependency of the catalyzed peracetic acid bleach

The experiments were carried out similarly to Example 5. In addition, 0.25 g/l of TAED was added to each wash liquor. The Table below lists the respective differences in reflectance, ARE, for laundry with and without catalyst.

| | Catalyst concentration [mg/l] | | | | |
|---|---|---|---|---|---|
| Catalyst | 0 | 1.5 | 3 | 6 | 12 |
| K1 | 0 | +1.6 | +2.2 | +3.0 | +3.3 |
| K4 | 0 | +1.6 | +2.6 | +1.5 | +0.7 |
| K2 | 0 | +2.4 | +2.8 | +4.5 | +5.4 |

The results show that the novel catalysts even at very low concentrations bring about a marked increase in the bleaching performance of peracetic acid.

Example 7

Influence of different oxidizing agents on the bleaching effect

The washing experiments were carried out in the Linitest apparatus at 20° C.

Water hardness: 15° dH

Washing time: 30 minutes

Soiling: Tea on cotton (BC-1)

Detergent: 1.5 g/l WMP detergent

Oxidation systems: PAP: Phthalimidoperoxycaproic acid (0.5 g/l)

BOBS: Sodium benzoyloxybenz enesulfonate (0.25 g/l) in combination with 0.5 g/l of sodium perborate monohydrate Caroate: Potassium peroxomonosulfate (0.5 g/l)

The Table below lists the respective differences in reflectance, ΔRE, for laundry with and without catalyst.

| | | Oxidizing agent | | |
|---|---|---|---|---|
| Catalyst | | PAP | BOBS | Caroate |
| K1 | without | +7.1 | +6.0 | +3.2 |
| | with | +9.2 | +6.5 | +5.8 |
| K4 | without | +7.6 | +6.5 | +3.7 |
| | with | +9.1 | +7.2 | +5.6 |
| K2 | without | +7.0 | +5.9 | +3.1 |
| | with | +9.0 | +8.8 | +6.7 |

The results show that the catalysts are capable even at very low concentrations of increasing the bleaching performance of various oxidizing agents at 20° C.

We claim:

1. A bleach system comprising an inorganic peroxide or an organic peroxycarboxylic acid and a bis- or tris($\mu$-oxo) dimanganese complex salts of the formula I $$[LMn(\mu\text{-}O)_a(\mu\text{-}OAc)_bMnL]^xA_y \quad (I)$$

in which

Ac is a $C_2$–$C_8$-acyl group, a is1, 2 or 3, b is 0 if a is 2 or 3 or is 2 if a is 1, x denotes the number of positive charges and is 2 or 3, A is an anion with a negative charge of one or two, y is the equivalent amount of anion A required to compensate the positive charges, and L is a ligand of Formula III (III)

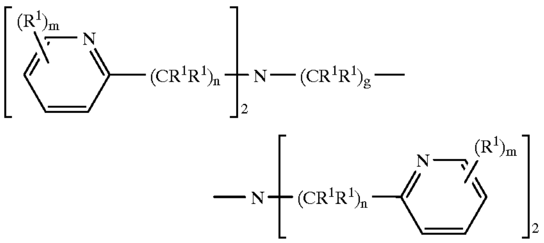

in which $R^1$ is hydrogen, $C_1$–$C_{12}$-alkyl, $C_5$–$C_{10}$-cycloalkyl, $NH_2$, $NHR^2$, $N(R^2)_2$, OH, $OR^2$, COOH, $COOR^2$, Cl, Br, F or CN; $R^2$ is $C_1$–$C_{12}$-alkyl or $C_5$–$C_{10}$-cycloalkyl; g is 2 or 3; and m and n are zero or an integer from 1 to 4.

2. A bleach system as claimed in claim 1, which comprises compounds of the formula I in which all substituents $R^1$ in the ligands L are hydrogen and n=1.

3. A bleach system as claimed in claim 1, which comprises compounds of the formula I in which A is $Cl^-$, $Br^-$, $I^-$, $NO_3^-$, $ClO_4^-$, $NCS^-$, $PF_6^-$, $RSO_3^-$, $RSO_4^-$, $SO_4^{2-}$, $BPh_4^-$, or $OAc^-$.

4. A bleach system as claimed in claim 1, which comprises the bleaching catalyst in granulated form.

5. A bleach system as claimed in claim 1, which comprises the bleaching catalyst as a constituent of bleach activator granules.

6. A detergent or cleaner comprising a bleach system as claimed in claim 1.

7. A bleach system as claimed in claim 1, which comprises an inorganic peroxide.

8. A bleach system as claimed in claim 7, wherein the inorganic peroxide is a percarbonate, a perborate, a perphosphate, a persilicate, or a peroxomono-or-disulfate.

9. A bleach system as claimed in claim 1, which additionally comprises a bleach activator.

10. A bleach system as claimed in claim 9, wherein the bleach activator is a reactive ester, an amide, animide, an anhydride, or a nitrile.

* * * * *